INVENTOR.
HARRY B. SHAPER
BY S. Michael Pringles
ATTORNEY

INVENTOR.
HARRY B. SHAPER
ATTORNEY

HARRY B. SHAPER, INVENTOR.

Patented May 20, 1947

2,420,686

UNITED STATES PATENT OFFICE 2,420,686

HEARING AID AMPLIFIER

Harry B. Shapiro, Cleveland, Ohio, now by judicial change of name Harry Bryant Shaper, assignor to Sonotone Corporation, Elmsford, N. Y., a corporation of New York Application March 3, 1943, Serial No. 477,895

9 Claims. (Cl. 179—171)

This invention relates to amplifier hearing aids, and more particularly to electron amplifier hearing aids, all the elements of which must be small and light enough for inconspicuous and comfortable wear on the body of the user, such as disclosed in my copending application Serial No. 418,857, filed November 12, 1941, as a continuation-in-part of the application Serial No. 294,649, filed September 13, 1939, now Patent No. 2,327,320.

Among the objects of the invention is an electronic amplifier hearing aid of the foregoing type arranged to operate with the desired selected predetermined sensitivity over a desired sound input level range of comfortable hearing, such as up to a level of about 70 db. above the threshold of hearing, while preventing sound inputs rising above said desired predetermined level from substantially increasing the sound output supplied to the user.

The foregoing and other objects of the invention will be best understood from the following description of exemplifications thereof, reference being had to the accompanying drawings wherein Fig. 1 is a circuit diagram of an electron amplifier hearing aid in connection with which one exemplification of the invention will be described;

A user of a hearing aid usually desires to hear the voice of a near-by person, as well as the voice of a person who is farther away in the room. However, he usually does not care to hear the room noise, which in a quiet room is at a level of about 30 to 40 db. above the threshold of normal hearing. In addition, in cases where the hearing aid amplifier is adjusted to enable the user to hear at a distance, for instance, across the room, the individual having severe hearing nerve impairment, also known as perceptive hearing impairment, frequently suffers when hearing a close-up voice, because of the excessive amplification of the so-adjusted amplifier hearing aid.

When applied to an electron tube hearing aid amplifier, the known automatic volume control systems of the type used in radio broadcast receivers and public address amplifiers, will not provide a solution to the foregoing requirements and difficulties. In addition, the prior attempts to apply to hearing aids the known automatic volume controls operating to give at all times a given power output, proved unsatisfactory because they raised room noise and other undesirable sounds to the same level as the voice of a nearby person. Furthermore, the known automatic volume controls of the type used in radio broadcast receivers, require bulky instrumentalities and could not be embodied in an electron-tube amplifier hearing aid without making it cumbersome. In particular, in order to delay the automatic action of the conventional automatic volume control systems, they require special operating circuits that would introduce undesirable complications in the hearing aid circuit.

I have found that such small compact electron tube hearing aid amplifier of the type described in my above identified Patent No. 2,327,320, for instance, and having an overall volume of as small as about 4 x 2¼ x ¾ inches, may be combined with special automatic peak output cut-off or equalization means that will overcome the foregoing difficulties without materially adding to the bulk of the amplifier, and without introducing overload distortion.

Figure 1:
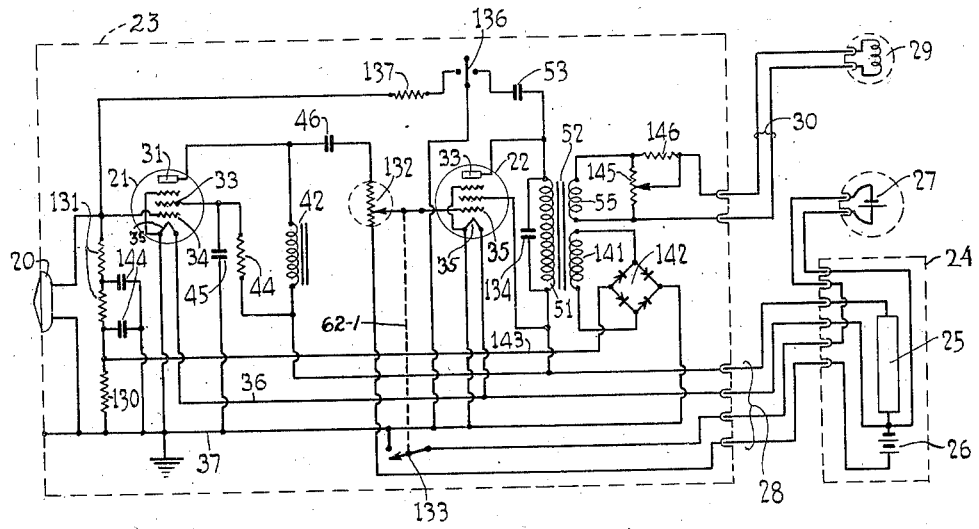

One exemplification of the principles underlying the invention as embodied in such compact hearing aid amplifier will be explained in connection with one specific exemplification thereof as illustrated in Fig. 1.

The hearing aid shown comprises a microphone 20, an electron tube amplifier having a single voltage amplifier tube 21, a power amplifier tube 22 and the associated circuit elements, all housed in a flat compact casing 23 which is small enough for inconspicuous wear, for instance, in the vest pocket of the user. An electrical battery assembly 24 small enough to be inconspicuously worn by the user, comprising a battery unit formed of a multi-cell anode or plate supply battery 25, and grid bias cells 26 and a cathode heating battery cell 27 is connected to the amplifier circuits through a multi-conductor cord 28. A hearing inducing receiver 29 is similarly connected to the amplifier unit by a cord branch 30.

Although various types of microphones may be used, the amplifier shown is designed to be operated from a self-generating microphone 20, such as a diaphragm driven Rochelle salt crystal microphone, which gives an output of from 5 to 10 millivolts when actuated by speech of normal loudness from a distance of about one foot. Alternatively, a condenser microphone, which is combined with an electret so as to generate voltages in response to the vibrations imparted to one of the condenser microphone electrodes, may be used. The amplifier is designed for use with a standard electromagnetic receiver or piezoelectric receiver of the type which are now on the market. Standard bone conduction receivers of the type described in patent Re. 21,030, which have a resistance of about 20 ohms and an inductance of about 10 millihenries and require about 15 to 20 milliwatts driving energy, perform excellently with such amplifier.

The microphone 20 is of the diaphragm-driven Rochelle-crystal type, and its output is impressed on the control grid 34 of the voltage amplification stage across a grid leak resistance including a resistor element 60 having an overall resistance sufficiently high so as to not affect the operation of the microphone 20. The output of the voltage amplifier gain stage is impressed through the blocking condenser 46 on an input circuit to the power amplification stage including a rheostat unit 62, having an adjustable tap connected to the control grid 35 of the power amplifier tube 22, the adjustable tap rheostat 62 serving as a grid leak and also to adjustably control the output of the power amplifier stage.

In the form indicated in Fig. 1, the adjustable volume control rheostat 62 is combined with a snap switch 63 connected in the lead 37 of the cathode heating circuit, and a common grip 62—1 is utilized to operate the volume control rheostat 62 and the switch 63. The rheostat 62 and the switch 63 may be of the type described in my copending application Serial No. 418,856, filed November 12, 1941.

A condenser 64 is shown connected in shunt to the primary winding of the output transformer 52, the condenser being of relatively small capacity and its only function being to cut off too high frequencies, say above 4000 or 5000 cycles, the amplification of which has been found by experience to be undesirable in hearing aids intended for all-around use.

There is also shown provided a multi-position switch unit 66 which may be moved from the position shown to the position in which it connects a condenser 53 in parallel to the primary winding 51 of the output transformer and thereby establish in conjunction with the inductance of the receiver 29, reflected into the primary side of the transformer circuit, a resonant circuit which boosts the selected part of the low frequency response while lowering the response in the selected part of the high frequency response. The switch 66 may be also moved to the opposite position in which it connects the resistance 67 in parallel to the microphone 20 so as to cut off the response in a selected part of the low frequency range. The value of the resistance 67, which is connected parallel to the Rochelle crystal microphone 20 for cutting off a selected part of the low frequency response, is made sufficiently low compared with the capacitive impedance of the crystal element of the microphone in the low frequency range to assure that all frequencies below a selected low frequency, for instance, 500 cycles, the voltage developed by the microphone action across the resistance 67 is only a fraction of the voltage which a sound of a given level will develop across the resistance 67 at the frequencies above the selected frequency.

The sensitivity of the amplifier may be manually adjustable by the rheostat unit 62 and the character of the response over the frequency range may be selectively adjusted by the manually controlled switch unit 66.

The automatic peak cut-off action of the invention is obtained by impressing on the control grid 34 of the voltage amplifier stage of tube 21 a negative bias potential derived from a portion of the output voltage impressed on the receiver 27, and so choosing, designing and proportioning the various elements and parameters of the various circuits, as to secure the following cooperative resultant effects:

(a) That for sound input levels to which the microphone is exposed up to a predetermined desired intermediate sound level—the amplification of which is desirable and not disturbing to the user, such as about 70 db. above the threshold of hearing—the amplifier should operate without any substantial change of the amplifier sensitivity or gain;

(b) That for sound input levels rising above said predetermined desirable intermediate sound level—such as 70 db.—the sensitivity or gain of the amplifier shall be automatically decreased so as to prevent a rise of the receiver output above a desired maximum output level—such as that corresponding to a sound input level of about 70 db. above the threshold of hearing; and (c) That for sound level signals up to the maximum value of about 100 db., to which a hearing aid microphone might ordinarily be exposed, the negative bias applied to the control grid of the voltage amplification stage shall not reach a value that would bring about reactification of the amplified input signal or any other type of distortion.

In the form of automatic volume equalization arrangement shown in Fig. 1, the signal voltage derived from the output side of the amplifier stage is rectified by a rectifier unit 72 formed of four rectifier elements interconnected to form a rectifier bridge, two diametrical bridge terminals being connected to an additional secondary winding 71 of the transformer 52. The two other diametrical terminals of the rectifier bridge 72 are connected, respectively, to the ground lead 37, and through lead 74 to grid leak resistance elements of the control grid 34 of the voltage amplifier tube 21 for impressing on this grid a negative bias corresponding in a predetermined manner described hereinafter to the variations of the output potential in the output circuit of the power amplifier stage of tube 22. The grid leak resistor circuit through which the rectified biasing voltage is impressed on the control grid of the voltage amplifier tube 21 includes a ripple filter formed of two series filter resistors 61, and two shunt connected filter condensers 74, the filter circuit being designed to have a negligibly small time constant.

Figure 2:
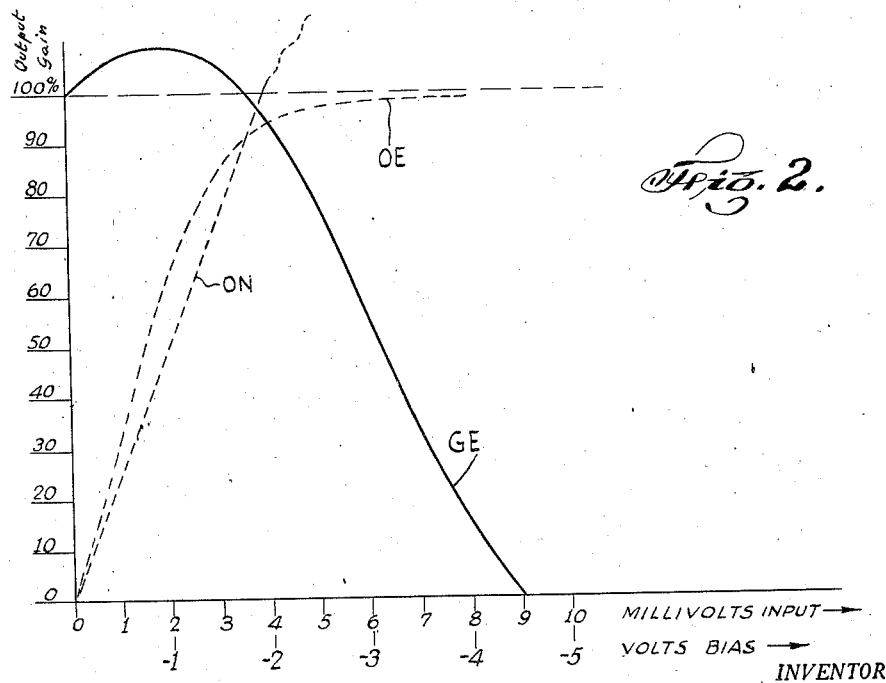
Fig. 2 is a curve diagram explaining the principles underlying the operation of the amplifier hearing aid of Fig. 1.

The amplifier of Fig. 1 is designed so that when operating without the automatic peak cut-off of the invention, it will have operating characteristics indicated by curve ON in Fig. 2. Curve ON shows, for increasing microphone input voltage, the amplified output in terms of percentage of the maximum undistorted output represented by the horizontal line marked "100%." The curve ON shows that for microphone inputs above about 4 millivolts, the output becomes distorted, the microphone input of about 4 millivolts being less than half of the microphone input of about 10 millivolts obtained when the sound input level rises to about 100 db. above the threshold of normal hearing.

It can be shown that if an excessive negative biasing voltage is applied to the control grid of the gain tube 21 of such amplifier, in the specific amplifier, higher than about −4 volts, rectification of the amplified voltage and excessive distortion will occur. This limits the maximum negative bias that can be applied to the gain tube of a hearing aid amplifier. It can also be shown that if the control grid of such gain tube of such amplifier would be subjected to automatic bias control by a rectified component of the output voltage, without providing means for rendering it ineffective in the lower sound input level range, the amplifier sensitivity at low sound levels would be so reduced as to render it unsatisfactory for a hearing aid.

According to the invention, all of the foregoing difficulties are eliminated by proportioning and correlating the various elements and parameters of the amplifier and the automatic biasing circuits so that for sound input levels up to a predetermined desired intermediate sound input level, the amplification of which would be normally desirable, and below the maximum sound input of 100 db. up to which a hearing aid amplifier is generally desired to operate—in the amplifier of Fig. 1, up to about —2 volts grid bias applied to tube 21, corresponding to the rise in sound level up to about 70 to 80 db.—the amplifier should operate without any decrease of the amplifier sensitivity or gain; and that for sound input levels rising above said predetermined intermediate sound level, such as about 70 to 80 db., the sensitivity or gain of the amplifier shall be automatically decreased, notwithstanding a further rise of the negative bias automatically applied to the control grid of the gain tube—in the case shown, for a negative bias voltage rise from —2 to —4 volts, corresponding to a rise of the sound input level from about 70 to 80 db. to a level of about 100 db.

When used with such automatic biasing action of the invention, the amplifier operates with a gain curve GE, Fig. 2. Gain curve GE shows that the sensitivity or gain of the amplifier remains about the desired maximum level—represented by 100%—for a rise of the microphone input up to about 4 millivolts, corresponding to the intermediate sound input level of about 70 db.; and that the sensitivity or gain of the amplifier is automatically reduced for the further rise in the microphone input, in the case shown, from about 4 millivolts, corresponding to said intermediate sound level input of about 70 to 80 db. up to the maximum sound input level of about 100 db., giving a microphone input of about 10 millivolts.

The receiver output of an amplifier hearing aid equipped with such automatic equalization circuit, represented by curve OE in Fig. 2, rises gradually until it reaches the desired maximum value, represented by 100%, at said intermediate sound input level of about 70 to 80 db. or 4 millivolts, and does not rise above said desirable value for a further rise of the sound input level from said intermediate sound input level of about 70 to 80 db. to the upper level of about 100 db.

In other words, the hearing aid amplifier of the invention and its automatic biasing circuits are so arranged that the gain and output of the amplifier shall not decrease under increasing negative bias applied by the rectified voltage to the gain control grid, up to an intermediate voltage, below the bias voltage causing distortion, in the amplifier of Fig. 1 up to about —2 volts grid bias for tube 21, corresponding to a rise in the sound level up to about 70 to 80 db.; and that the gain shall decrease and prevent a rise of the power output above the maximum chosen power level, represented by 100% in Fig. 2, under a further increase of the negative bias, from said intermediate value, corresponding to a sound input level of about 70 to 80 db., up to the limit of the distortion free operating range—in the amplifier of Fig. 1 for a negative bias voltage rise from —2 to —4 volts corresponding to a rise of the sound input level from about 70 to 80 db. to the level of about 100 db.

Such operating conditions may be secured in accordance with the invention as follows: The voltage amplifier tube of a hearing aid amplifier has one of its electrodes operating with a positive potential—the value of which determines the gain of the amplifier stage, such as the plate or screen electrode (designated, for simplicity, gain-setting electrode) of a high gain amplifier tube—connected to the source of the D. C. voltage through a series impedance, and the elements and parameters of the amplifier circuits, which are subjected to the control of a rectified output voltage component, are so designed and correlated that an increase of the negative control grid bias of the voltage amplifier tube, up to an intermediate value corresponding to an increase in the sound input intensity up to 70 to 80 db., shall cause a sufficient decrease of the D. C. voltage drop across said series impedance and a sufficient rise of the positive potential of the gain-setting tube electrode supplied therethrough so as to prevent a drop of the gain, and of the amplifier output notwithstanding the grid control action of the rectified output component tending to decrease the gain; and that a further increase of the negative control grid bias up to the value at which substantial distortion sets in, corresponding to an increase in the sound intensity from about 70 to 80 db. up to the level of about 100 db., shall not materially affect the D. C. current through said impedance and the positive potential of said gain setting tube electrode, so that the increase in the negative control grid bias shall cause the gain to drop to a lower value and prevent a rise of the output above the desired maximum level, such as represented by 100% line in Fig. 2.

Voltage amplification stages using triodes or screen grid or pentode tubes of the type suitable for use in hearing aid amplifiers may be readily designed to operate with such characteristics. Since voltage amplifiers using screen grid tubes give a much higher gain than those using triodes, and make possible control of the gain over a wider range, the application of the principles of the invention to a screen grid or pentode tube voltage amplifier is of greater effectiveness and will be here more fully described.

I have found that in following the foregoing principles of the invention, a compact wearable hearing aid amplifier using an available type of high gain tube, in the voltage amplifying part, and operating with a positive electrode supply voltage in the range commercially practical for hearing aids, may have its elements and operating parameters readily proportioned and adjusted to operate with a gain characteristic of the type generally represented by curve GE in Fig. 2.

Thus, the elements of the amplifier of Fig. 1 may be readily so designed that as the negative control grid bias of tube 21 is increased up to —2 volts, the gain remains substantially constant, being represented by the substantially level portion of curve GE near the 100% level; and that the further increase of the negative grid control bias from —2 volts to —4.5 volts, decreases the gain along the sharply sloping part of curve GE.

In accordance with the invention, such amplifier, operating with a gain characteristic of the type represented by curve GE is combined with an automatic equalization circuit of the type described in connection with Fig. 1, so as to operate with the desirable overall output characteristics represented by curve OE, and to cause the sensitivity of the amplifier to rise to within about 90% of its maximum desired sensitivity level for a sound level rise up to between about 70 to 80 db. above the threshold; and to cause a reduction of the sensitivity and permit only a slight further rise of the output to not more than about 10% of its maximum, for a further rise of the sound level from about 70 to 80 db. up to about 100 db. above the hearing threshold.

In other words, the elements and parameters of the hearing aid amplifier and the associated automatic equalization circuits are so proportioned and correlated that the sensitivity control exerted by the equalization circuit shall not decrease the amplifier output for sound input signals below about 70 to 80 db. above the threshold of hearing; and to bring about effective action of the equalization circuit to prevent the output from rising appreciably above that obtained at sound input levels of about 70 to 80 db. above the threshold of hearing when the sound input level is increased to about 100 db.

Such combinations of a hearing aid amplifier with such automatic peak cut-off arrangement may be readily designed so as to assure that for a sound signal input up to the maximum value of about 100 db., to which a hearing aid microphone might ordinarily be exposed, the negative bias applied to the control grid of the voltage amplification stage will not reach a value that would bring about rectification of the amplified input signal and harmonic distortion.

Without thereby intending to limit its scope, but only to facilitate the practice of the present invention, there are given below design data for one specific practical embodiment of the hearing aid amplifier of the type described above.

The gain tube 21 was a commercial high gain pentode and was adjusted to operate across the coupling inductance choke 42 with the gain characteristic curve GE in Fig. 2, when supplied from a 45 volt B battery, and a series screen grid resistor 44 of about 250 ohms. A rectifier unit 73 of four flat copper oxide rectifier elements, each $\frac{3}{16} \times \frac{3}{16} \times \frac{3}{64}$ inch, assembled in a bridge unit of $\frac{3}{16} \times \frac{3}{16} \times \frac{3}{8}$ inch overall dimensions. Two filter condensers 74 of .03 microfarad each, and two filter resistors 61 of 2 megohms each. The secondary windings 71 had a turn ratio to impress on the control grid 34 of tube 21 about −2 volts bias at a microphone input of about 4 millivolts corresponding to a normal sound input level, at which about 90% of the maximum output was desired, in the way indicated in Fig. 2.

In general, the resistor 44 connected in series with the screen electrode supply lead of the gain tube should be so proportioned in relation to the D. C. impedance in the plate lead that over the part of the range over which the peak control is to be ineffective and in which the gain is to remain substantially level, an increase of the negative control grid bias of the gain tube shall decrease the screen current so as to bring about an increase of the screen potential sufficient to maintain the gain level, notwithstanding the increase in the negative grid bias; and that over the further part of the range in which the peak cut-off is to be effective, and in which the gain is to be lowered, further increase of the negative control grid bias shall decrease the screen current and the rise of the screen potential shall be only so slight that the increasingly negative grid bias shall be sufficiently effective in decreasing the gain as to assure that the output does not rise above the desired maximum value.

In a hearing aid amplifier combined with an automatic peak equalization in accordance with the invention, means may be provided for adjusting the power output level independently of the sensitivity adjustment. Thus, as shown in Fig. 1, by connecting in the output circuit portion leading to the receiver winding a suitable combination of shunt connected volume rheostat 75 and series resistance, proportioned so that adjustment of the volume does not modify the load impedance, the user may adjust the output to the maximum level desired by the user without changing the sensitivity of the amplifier, the sensitivity being controlled automatically and the maximum sensitivity being independently adjustable by the rheostat 62. When using a receiver 29 representing a 100 ohm load, a rheostat 75 of 1000 ohms and series resistor 76 of 100 ohms will give a satisfactory power output control.

Alternatively, the output may be independently controlled by operating the amplifier with higher voltage or a lower voltage B battery, depending on the desired power output. If it is desired to avoid separate manual adjustments for the power output and sensitivity, an arrangement of the type shown in Fig. 3 may be used instead. It can be shown by a hearing aid amplifier of the type described in connection with Fig. 1, having the screen grid of the gain tube 21 supplied with the D. C. potential through a suitably designed resistance network, such as that formed by rheostat 81, and series resistor 82, an initial adjustment of the rheostat 81 to reduce the screen voltage from the maximum gain position, giving a substantial reduction of the maximum gain of the order of about 20 db., will give only a slight decrease of the output of the order of 6 db., and that a further adjustment of the screen potential effected by the rheostat will be effective in lowering the output. In the arrangement shown, this may be accomplished by using a rheostat 81 of about one megohm and a series resistor 82 of about ¼ megohm.

Figure 3:
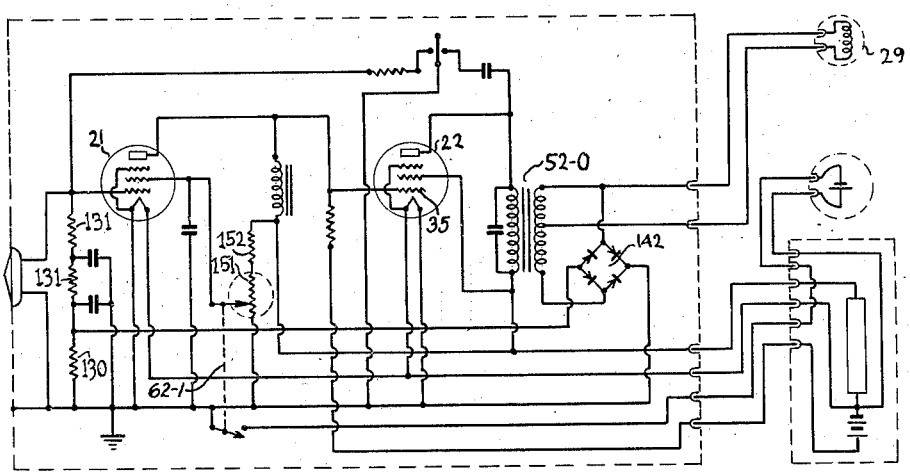
Figs. 3 to 5 are circuit diagrams similar to Fig. 1 illustrating other exemplifications of the invention.

Instead of using a separate secondary winding for supplying the rectified voltage component, an auto-transformer arrangement of the type shown in Fig. 3 may be used.

Figure 4:
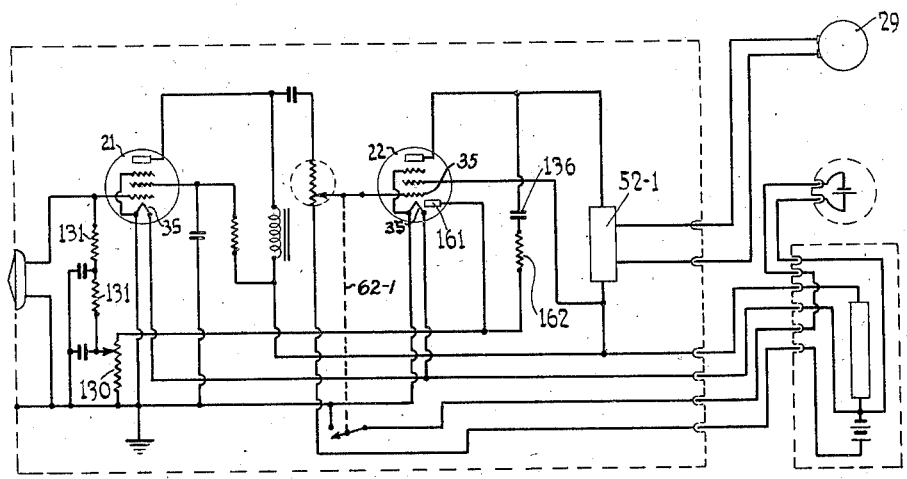

Fig. 4 shows how a hearing aid amplifier arrangement of the type described in connection with Fig. 1 may be designed for operation with diode rectifier using an anode 91 cooperating with the cathode 35 of the power amplifier tube. The required voltage component, the magnitude of which is determined by the ratio of the resistance 92 to the output circuit impedance 52—1, is rectified by the diode formed by cathode 35 and anode 91, and impressed to apply the suitable negative control bias to the control grid 34 of tube 21 in accordance with the principles explained in connection with Fig. 1.

Figure 5:
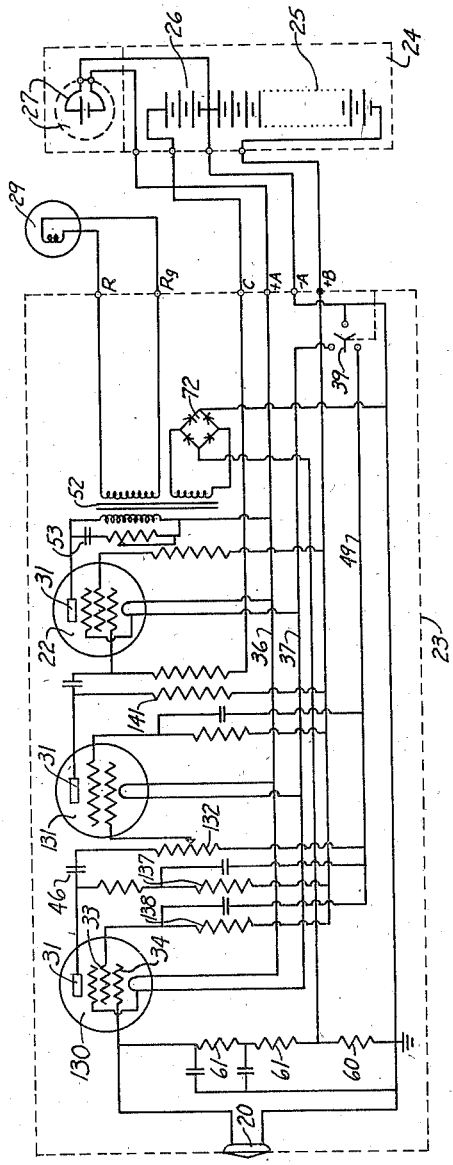

The foregoing considerations govern also the application of the principles of the invention to electronic amplifier hearing aids shown in Fig. 5 using amplifiers, all amplification stages of which are resistance coupled, in the manner described in Fig. 18 of Patent No. 2,327,320. It comprises a microphone 20 and a receiver 29 with a battery assembly 24, 26, 27 similar to those shown in Fig. 1 and an amplifier formed of two resistance coupled voltage amplification stages associated with the electron amplifier tubes 130, 131 and a power amplifier stage associated with a tube 22 which is similar to the power amplifier stage shown in Fig. 1. The voltage amplifier tubes 130, 131 are shown as pentode tubes, each having a plate 31, a suppressor grid 32, a screen grid 33, a control grid 34 and a cathode 35 which are interconnected to the battery assembly similar as in Fig. 1. The output of the microphone is impressed on the control grid of the first tube 130 across a resistor 135 and the output of the amplifier tube 130 is impressed across a coupling resistor 136 upon the control grid of the second amplifier tube 131. The amplified output of the second amplifier tube 131 is impressed across the coupling resistor 141 on the control grid of the power amplifier 22 which delivers its output through the output transformer 52 to the receiver 29.

The amplifier circuit is equipped with a peak equalization circuit similar to that described in connection with Fig. 1 so as to supply a rectified output voltage component to its voltage amplification stage 130. Assuming that the D. C. supply lead to the plate of tube 130 has a resistance of about two megohms, the resistance 138 connected in the D. C. supply lead to the screen grid 33 of tube 130 will have to be much greater, of the order of about four megohms, in order to secure the desired selective peak-off control action in accordance with the principles of the invention described above in connection with Figs. 1 to 4.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

I claim:

1. In an electron tube amplifier, such as used in an inconspicuously wearable hearing aid designed to be energized from a direct-current source for amplifying the output of a microphone and supplying amplified output to a receiver; amplifier circuits including at least one voltage amplifier stage and a power amplifier stage having an output circuit; said voltage amplifier stage including a multi-electrode amplifier tube having a cathode, a control electrode and an additional electrode operated at a positive electrode potential the magnitude of which affects the magnitude of the gain; said amplifier circuits including an impedance element serially connected between said source and said additional electrode so that the D. C. voltage drop across said impedance determines said positive electrode potential; the elements of said amplifier being designed to impress on said output circuit an output of predetermined maximum output level when actuated by an input of a predetermined intermediate input level; a biasing circuit for deriving from said output circuit and impressing on said control electrode a rectified negative bias voltage which increases over a predetermined bias range when said output is increased to about said maximum level; the elements of said biasing circuit being so designed and correlated to the other elements of said amplifier circuit and the negative bias voltage being so correlated to the output voltage impressed on said output circuit— that for input levels up to said intermediate input level the amplifier shall operate without any substantial change in the sensitivity—and that for input levels in the range above said intermediate level an increase in the input shall increase said negative bias so as to substantially prevent a rise of the output above said maximum level.

2. In an electron tube amplifier, such as used in an inconspicuously wearable hearing aid designed to be energized from a direct-current source for amplifying the output of a microphone and supplying amplified output to a receiver; amplifier circuits including at least one voltage amplifier stage and a power amplifier stage having an output circuit; said voltage amplifier stage including a multi-electrode amplifier tube having a cathode, a control electrode and an additional electrode operated at a positive electrode potential the magnitude of which affects the magnitude of the gain; said amplifier circuits including an impedance element serially connected between said source and said additional electrode so that the D. C. voltage drop across said impedance determines said positive electrode potential; the elements of said amplifier being designed to impress on said output circuit an output of predetermined maximum output level when actuated by an input of a predetermined intermediate input level; a biasing circuit for deriving from said output circuit and impressing on said control electrode a rectified negative bias voltage which increases over a predetermined bias range when said output is increased to about said maximum level; the elements of said biasing circuit being so designed and correlated to the other elements of said amplifier circuit and the negative bias voltage being so correlated to the output voltage impressed on said output circuit—that an increase of the negative bias voltage over a low bias range up to a predetermined intermediate bias level corresponding to an input increase to about said intermediate input level, shall cause a sufficient rise of said positive electrode potential as to prevent a substantial drop of the gain over said low bias range—and that a further increase of the negative bias corresponding to an input increasing above said intermediate input level, shall cause said positive electrode potential to be maintained at such level as to cause said further increase of the negative bias to produce a reduction in the gain sufficient to prevent a rise of the output substantially above said maximum level.

3. In an electron tube amplifier, such as used in an inconspicuously wearable hearing aid designed to be energized from a direct-current source for amplifying the output of a microphone and supplying amplified output to a receiver; amplifier circuits including at least one voltage amplifier stage and a power amplifier stage having an output circuit; said voltage amplifier stage including a multi-electrode amplifier tube having a cathode, a control electrode, an anode and a screen electrode operated at a positive screen-electrode potential the magnitude of which affects the magnitude of the gain; said amplifier circuits including an impedance element serially connected between said source and said screen electrode so that the D. C. voltage drop across said impedance determines said positive screen-electrode potential; the elements of said amplifier being designed to impress on said output circuit an output of predetermined maximum output level when actuated by an input of a predetermined intermediate input level; a biasing circuit including rectifier means interconnected to said output circuit for impressing on said control electrode a rectified negative bias voltage which increases over a predetermined bias range when said output is increased to about said maximum level; the elements of said biasing circuit being so designed and correlated to the other elements of said amplifier circuit and the negative bias voltage being so correlated to the output voltage impressed on said output circuit—that an increase of the negative bias voltage over a low bias range up to a predetermined intermediate bias level corresponding to an input increase to about said intermediate input level, shall cause a sufficient decrease in said D. C. voltage drop and a sufficient rise of said positive screen-electrode potential as to prevent a substantial drop of the gain over said low bias range—and that a further increase of the negative bias over the higher part of the bias range corresponding to an input increasing above said intermediate input level, shall cause said positive screen-electrode potential to be maintained at such level as to cause said further increase of the negative bias to produce a reduction in the gain sufficient to prevent a rise of the output substantially above said maximum level.

4. In an electron tube amplifier, such as used in an inconspicuously wearable hearing aid designed to be energized from a direct-current source for amplifying the output of a microphone and supplying amplified output to a receiver; amplifier circuits including at least one voltage amplifier stage and a power amplifier stage having an output circuit including an output transformer; said voltage amplifier stage including a multi-electrode amplifier tube having a cathode, a control electrode, an anode and a screen electrode operated at a positive screen-electrode potential the magnitude of which affects the magnitude of the gain; said amplifier circuits including an impedance element serially connected between said source and said screen electrode so that the D. C. voltage drop across said impedance determines said positive screen-electrode potential; the elements of said amplifier being designed to impress on said output circuit an output of predetermined maximum output level when actuated by an input of a predetermined intermediate input level; a biasing circuit including transformer windings forming part of said transformer and rectifier means interconnected therewith for impressing on said control electrode a rectified negative bias voltage which increases over a predetermined bias range when said output is increased to about said maximum level; the elements of said biasing circuit being so designed and correlated to the other elements of said amplifier circuit and the negative bias voltage being so correlated to the output voltage impressed on said output circuit—that an increase of the negative bias voltage over a low bias range up to a predetermined intermediate bias level corresponding to an input increase to about said intermediate input level, shall cause a sufficient rise of said positive screen-electrode potential as to prevent a substantial drop of the gain over said low bias range—and that a further increase of the negative bias corresponding to an input increasing above said intermediate input level, shall cause said positive screen-electrode potential to be maintained at such level as to cause said further increase of the negative bias to produce a reduction in the gain sufficient to prevent a rise of the output substantially above said maximum level.

5. In an electron tube amplifier, such as used in an inconspicuously wearable hearing aid designed to be energized from a direct-current source for amplifying the output of a microphone and supplying amplified output to a receiver; amplifier circuits including at least one voltage amplifier stage having an input circuit and a power amplifier stage having an output circuit including an output transformer having primary windings and secondary windings; said voltage amplifier stage including a multi-electrode amplifier tube having a cathode, a control electrode, an anode and a screen electrode operated at a positive screen-electrode potential the magnitude of which affects the magnitude of the gain; said amplifier circuits including an impedance element serially connected between said source and said screen electrode so that the D. C. voltage drop across said impedance determines said positive screen-electrode potential; the elements of said amplifier being designed to impress on said output circuit an output of predetermined maximum output level when actuated by an input of a predetermined intermediate input level; a biasing circuit including additional windings forming part of said transformer and rectifier means interconnected therewith for impressing on said control electrode a rectified negative bias voltage which increases over a predetermined bias range when said output is increased to about said maximum level; the elements of said biasing circuit being so designed and correlated to the other elements of said amplifier circuit and the negative bias voltage being so correlated to the output voltage impressed on said output circuit—that an increase of the negative bias voltage over a low bias range up to a predetermined intermediate bias level corresponding to an input increase to about said intermediate input level, shall cause a sufficient decrease in said D. C. voltage drop and a sufficient rise of said positive screen-electrode potential as to prevent a substantial drop of the gain over said low bias range—and that a further increase of the negative bias over the higher part of the bias range corresponding to an input increasing above said intermediate input level, shall cause said positive screen-electrode potential to be maintained at such level as to cause said further increase of the negative bias to produce a reduction in the gain sufficient to prevent a rise of the output substantially above said maximum level.

6. In an electron tube amplifier, such as used in an inconspicuously wearable hearing aid designed to be energized from a direct-current source for amplifying the output of a microphone and supplying amplified output to a receiver; amplifier circuits including at least one voltage amplifier stage and a power amplifier stage having an output circuit; said voltage amplifier stage including a multi-electrode amplifier tube having a cathode, a control electrode and an additional electrode operated at a positive electrode potential the magnitude of which affects the magnitude of the gain; said amplifier circuits including an impedance element serially connected between said source and said additional electrode so that the D. C. voltage drop across said impedance determines said positive electrode potential; the elements of said amplifier being designed to impress on said output circuit an output of predetermined maximum output level when actuated by an input of a predetermined intermediate input level; a biasing circuit for deriving from said output circuit and impressing on said control electrode a rectified negative bias voltage which increases over a predetermined bias range when said output is increased to about said maximum level; the elements of said biasing circuit being so designed and correlated to the other elements of said amplifier circuit and the negative bias voltage being so correlated to the output voltage impressed on said output circuit—that an increase of the negative bias voltage over a low bias range up to a predetermined intermediate bias level corresponding to an input increase to about said intermediate input level, shall cause a sufficient rise of said positive electrode potential as to prevent a substantial drop of the gain over said low bias range—and that a further increase of the negative bias corresponding to an input increasing above said intermediate input level, shall cause said positive electrode potential to be maintained at such level as to cause said further increase of the negative bias to produce a reduction in the gain sufficient to prevent a rise of the output substantially above said maximum level; and regulating means including a movable rheostat element operative to adjust the magnitude of said maximum output level while maintaining predetermined sensitivity characteristics of the amplifier.

7. In an electron tube amplifier, such as used in an inconspicuously wearable hearing aid designed to be energized from a direct-current source for amplifying the output of a microphone and supplying amplified output to a receiver; amplifier circuit including at least one voltage amplifier stage and a power amplifier stage having an output circuit; said voltage amplifier stage including a multi-electrode amplifier tube having a cathode, a control electrode, an anode and a screen electrode operated at a positive screen-electrode potential the magnitude of which affects the magnitude of the gain; said amplifier circuits including an impedance element serially connected between said source and said screen electrode so that the D. C. voltage drop across said impedance determines said positive screen-electrode potential; the elements of said amplifier being designed to impress on said output circuit an output of predetermined maximum output level when actuated by an input of a predetermined intermediate input level; a biasing circuit including rectifier means interconnected to said output circuit for impressing on said control electrode a rectified negative bias voltage which increases over a predetermined bias range when said output is increased to about said maximum level; the elements of said biasing circuit being so designed and correlated to the other elements of said amplifier circuit and the negative bias voltage being so correlated to the output voltage impressed on said output circuit—that an increase of the negative bias voltage over a low bias range up to a predetermined intermediate bias level corresponding to an input increase to about said intermediate input level, shall cause a sufficient decrease in said D. C. voltage drop and a sufficient rise of said positive screen-electrode potential as to prevent a substantial drop of the gain over said low bias range—and that a further increase of the negative bias over the higher part of the bias range corresponding to an input increasing above said intermediate input level, shall cause said positive screen-electrode potential to be maintained at such level as to cause said further increase of the negative bias to produce a reduction in the gain sufficient to prevent a rise of the output substantially above said maximum level; and regulating means including a movable rheostat element interconnected with said output circuit and operative to adjust the magnitude of said maximum output level while maintaining predetermined sensitivity characteristics of the amplifier.

8. In an electron tube amplifier, such as used in an inconspicuously wearable hearing aid designed to be energized from a direct-current source for amplifying the output of a microphone and supplying amplified output to a receiver; amplifier circuits including at least one voltage amplifier stage and a power amplifier stage having an output circuit; said voltage amplifier stage including a multi-electrode amplifier tube having a cathode, a control electrode, an anode and an additional electrode operated at a positive electrode potential the magnitude of which affects the magnitude of the gain; said amplifier circuits including an impedance element serially connected between said source and said additional electrode so that the D. C. voltage drop across said impedance determines said positive electrode potential; the elements of said amplifier being designed to impress on said output circuit an output of predetermined maximum output level when actuated by an input of a predetermined intermediate input level; a biasing circuit including rectifier means interconnected to said output circuit for impressing on said control electrode a rectified negative bias voltage which increases over a predetermined bias range when said output is increased to about said maximum level; the elements of said biasing circuit being so designed and correlated to the other elements of said amplifier circuit and the negative bias voltage being so correlated to the output voltage impressed on said output circuit—that an increase of the negative bias voltage over a low bias range up to a predetermined intermediate bias level corresponding to an input increase to about said intermediate input level, shall cause a sufficient decrease in said D. C. voltage drop and a sufficient rise of said positive electrode potential as to prevent a substantial drop of the gain over said low bias range—and that a further increase of the negative bias over the higher part of the bias range corresponding to an input increasing above said intermediate input level, shall cause said positive electrode potential to be maintained at such level as to cause said further increase of the negative bias to produce a reduction in the gain sufficient to prevent a rise of the output substantially above said maximum level; and regulating means including a movable rheostat element interconnected with a part of the amplifier circuits extending between two amplifier stages and operative to adjust the sensitivity of said amplifier while maintaining said maximum output level over a predetermined output range.

9. In an electron tube amplifier, such as used in an inconspicuously wearable hearing aid designed to be energized from a direct-current source for amplifying the output of a microphone and supplying amplified output to a receiver; amplifier circuits including at least one voltage amplifier stage and a power amplifier stage having an output circuit; said voltage amplifier stage including a multi-electrode amplifier tube having a cathode, a control electrode, an anode and a screen electrode operated at a positive screen-electrode potential the magnitude of which affects the magnitude of the gain; said amplifier circuit including an impedance element serially connected between said source and said screen electrode so that the D. C. voltage drop across said impedance determines said positive screen-electrode potential; the elements of said amplifier being designed to impress on said output circuit an output of predetermined maximum output level when actuated by an input of a predetermined intermediate input level; a biasing circuit including rectifier means interconnected to said output circuit for impressing on said control electrode a rectified negative bias voltage which increases over a predetermined bias range when said output is increased to about said maximum level; the elements of said biasing circuit being so designed and correlated to the other elements of said amplifier circuit and the negative bias voltage being so correlated to the output voltage impressed on said output circuit—that an increase of the negative bias voltage over a low bias range up to a predetermined intermediate bias level corresponding to an input increase to about said intermediate input level, shall cause a sufficient decrease in said D. C. voltage drop and a sufficient rise of said positive screen-electrode potential as to prevent a substantial drop of the gain over said low bias range—and that a further increase of the negative bias over the higher part of the bias range corresponding to an input increasing above said intermediate input level, shall cause said positive screen-electrode potential to be maintained at such level as to cause said further increase of the negative bias to produce a reduction in the gain sufficient to prevent a rise of the output substantially above said maximum level; and regulating means including a movable rheostat element interconnected with a part of the amplifier circuits extending between two amplifier stages so as to modify the positive electrode potential applied to said screen electrode and operative to adjust the sensitivity of said amplifier.

HARRY B. SHAPIRO.

REFERENCES CITED

The following references are of record in the file of this patent:

UNITED STATES PATENTS

| Number | Name | Date |
| --- | --- | --- |
| 2,140,969 | Penn | Dec. 20, 1938 |
| 2,192,669 | Wengel | Mar. 5, 1940 |
| 2,257,870 | Dubilier | Oct. 7, 1941 |
| 1,959,062 | Place | May 15, 1934 |
| 2,244,695 | Hathaway | June 10, 1941 |